United States Patent
Lin

(10) Patent No.: US 6,193,325 B1
(45) Date of Patent: Feb. 27, 2001

(54) FIXING DEVICE FOR A BABY STROLLER FRAME AND A HUB

(76) Inventor: Hui-Liang Lin, P. O. Box 196, Fen Yuan City, Taichung (TW)

( * ) Notice: Subject to any disclaimer, the term of this patent is extended or adjusted under 35 U.S.C. 154(b) by 0 days.

(21) Appl. No.: 09/443,020

(22) Filed: Nov. 17, 1999

(30) Foreign Application Priority Data

Oct. 13, 1999 (TW) ............................................... 088217567

(51) Int. Cl.$^7$ ................................................ B60B 27/00
(52) U.S. Cl. ..................... 301/111; 301/124.2; 403/322.2
(58) Field of Search ................. 301/110.5, 111, 301/124.2, 120, 121, 122; 280/654, 47.38; 403/322.1, 322.2

(56) References Cited

U.S. PATENT DOCUMENTS

| | | | | |
|---|---|---|---|---|
| 4,477,121 | * | 10/1984 | Atkins | 301/124.2 X |
| 4,679,862 | * | 7/1987 | Luo | 301/124.2 X |
| 5,121,973 | * | 6/1992 | Phillips | 301/111 X |
| 5,215,356 | * | 6/1993 | Lin | 301/111 |
| 5,692,851 | * | 12/1997 | Pace | 403/322.2 X |

* cited by examiner

Primary Examiner—Russell D. Stormer

(57) ABSTRACT

A fixing device for a hub and a tube of a baby stroller frame includes a hub including an axial hole having two ends, each end of the hub having a bearing mounted therein. A tubular shaft of an appropriate length includes a longitudinal hole having two ends, each end of the shaft including a compartment having a diameter greater than that of the longitudinal hole of the shaft. One of the ends of the shaft includes an outer periphery with an outer threading formed thereon. The other end of the shaft is extended beyond the hub and includes two radial holes, a ball being partially received in each radial hole and partially exposed beyond the radial hole. A core rod includes an enlarged first end and a second end with a neck portion and a groove. A spring is mounted around the core rod. A dust cap is a soft cap made of plastic material with resiliency to provide a chamber for receiving the enlarged first end of the core rod that is extended beyond the shaft. The dust cap includes a dome that forms a push portion and a skirt that forms a connecting portion having a diameter smaller than that of the dome, the dust cap preventing entrance of dust into the axial hole of the hub. The balls on the shaft are biased outward by the core rod and thus exposed at a position bearing against an end of the fixing sleeve, thereby completing assembly of the baby stroller frame and the hub.

5 Claims, 8 Drawing Sheets

FIXING DEVICE FOR A BABY STROLLER FRAME AND A HUB

BACKGROUND OF THE INVENTION

1. Field of the Invention

The present invention relates to a fixing device for a baby stroller frame and a hub, and more particularly to a quick-release fixing device for reliably connecting a hub to a baby stroller frame.

2. Description of the Related Art

FIGS. 1 and 2 illustrate a conventional fixing device 1 for a baby stroller frame and a hub. The fixing device 1 includes a quick-release rod 11 having a front end connected to an end (with a lobe) of a lever 12. The quick-release rod 11 is extended through a plastic block 13, a washer 14, and a tube 15 with outer threading. The rod 15 is then extended through two bearings 17 in a hub 16, and two nuts 18 are respectively mounted to two ends of the rod 15. A sleeve 19 is threadedly engaged with one of the ends of the threaded rod 15 that extends beyond the hub 16. A threaded distal end 111 of the quick-release rod 11 extends beyond the sleeve 19 and engages with a resilient block 20 and a pressing block 21 and then fastened in place by a nut 22. The pressing block 21 is biased leftward with its conic section 211 bearing against a conic hole 201 in the resilient block 20. Thus, the resilient block 20 expands radially outward to tightly bear against an inner periphery of a tube 23 of the stroller frame. The stroller frame and the hub are thus securely engaged together. When the lever 12 is pivoted upward (FIG. 2), the quick-release rod 11 is moved rightward such that the pressing block 21 no longer presses against the resilient block 20. As a result, the resilient block 20 shrinks inward and thus does not bear against the inner periphery of the tube 23, thereby allowing rapid detachment of the hub 16 from the tube 23.

Nevertheless, the lever 12 might be inadvertently impinged and thus cause undesired detachment of the hub 16 during movement of the baby stroller.

SUMMARY OF THE INVENTION

It is a primary object of the present invention to provide a fixing device for reliable connection between a baby stroller frame and a hub.

It is another object of the present invention to provide a fixing device for a baby stroller frame and a hub including a hazard indication function to avoid the risk of detachment of the hub from the stroller frame resulting from shock or inadvertent impingement.

The above-mentioned objects are achieved by a fixing device for a baby stroller frame and a hub in accordance with the present invention. The fixing device includes:

a hub including an axial hole having two ends, each said end of the hub having a bearing mounted therein;

a shaft being tubular and having an appropriate length, the shaft including a longitudinal hole having two ends, each said end of the shaft including a compartment having a diameter greater than that of the longitudinal hole of the shaft, one of the ends of the shaft including an outer periphery with an outer threading formed thereon, the shaft being extended through the bearings in the hub and locked in place by a nut that is threadedly engaged with the outer threading of the shaft, the other end of the shaft being extended beyond the hub and including two radial holes, a ball being partially received in each said radial hole and partially exposed beyond said radial hole;

a core rod including an enlarged first end and a second end with a neck portion and a groove, a spring being mounted around the core rod, the core rod being extended through the longitudinal hole of the shaft with the enlarged first end of the core rod extended beyond said one of the ends of the shaft with the outer threading, the spring being received in one of the compartments defined in said one of the ends of the shaft, a C-clip being mounted in the groove and retained in the other compartment defined in the other end of the shaft;

a dust cap being a soft cap made of plastic material with resiliency to provide a chamber for receiving the enlarged first end of the core rod that is extended beyond the shaft, the dust cap including a dome that forms a push portion and a skirt that forms a connecting portion having a diameter smaller than that of the dome, the dust cap preventing entrance of dust into the axial hole of the hub; and a fixing sleeve securely mounted in the tube of the baby stroller frame, the fixing sleeve including a longitudinal hole through which a portion of the shaft outside the hub extends, the balls on the shaft being biased outward by the core rod and thus exposed at a position bearing against an end of the fixing sleeve, thereby completing assembly of the baby stroller frame and the hub.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
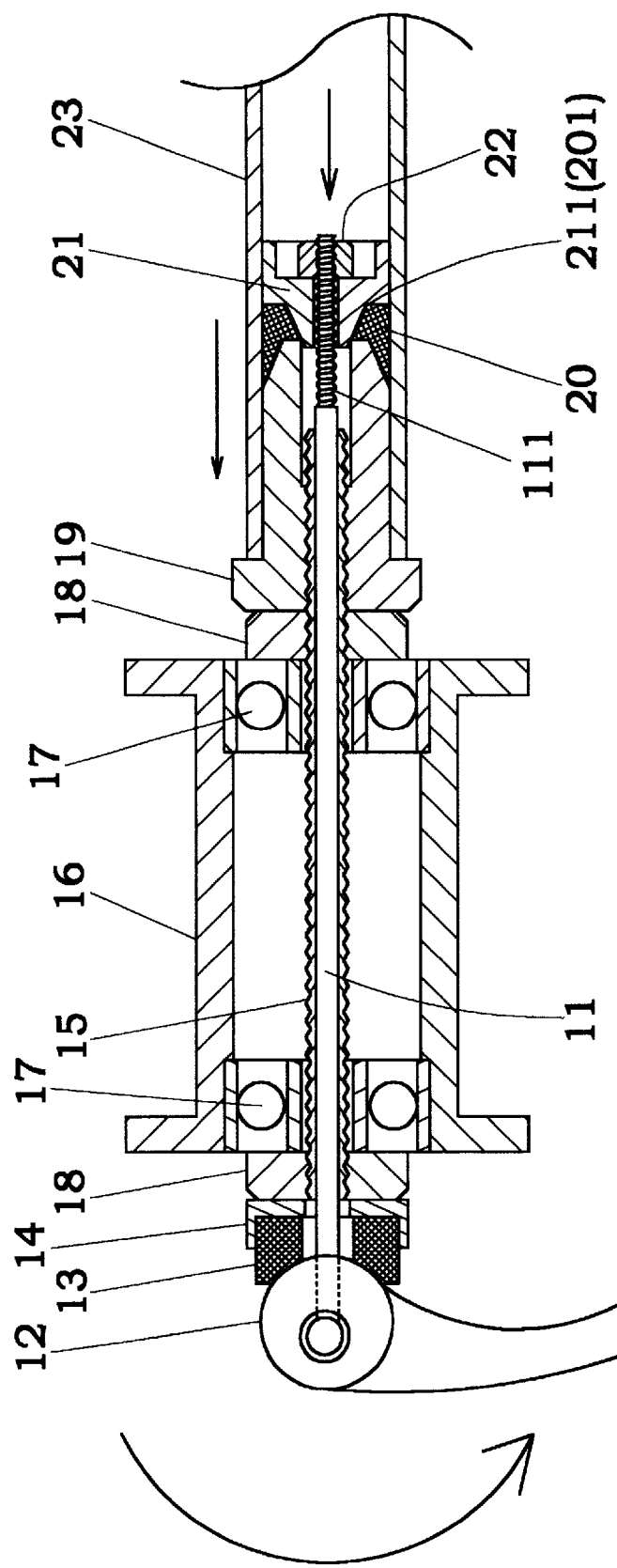
FIG. 1 is a sectional view of a conventional fixing device for a baby stroller frame and a hub in a fixed status.
Figure 2:
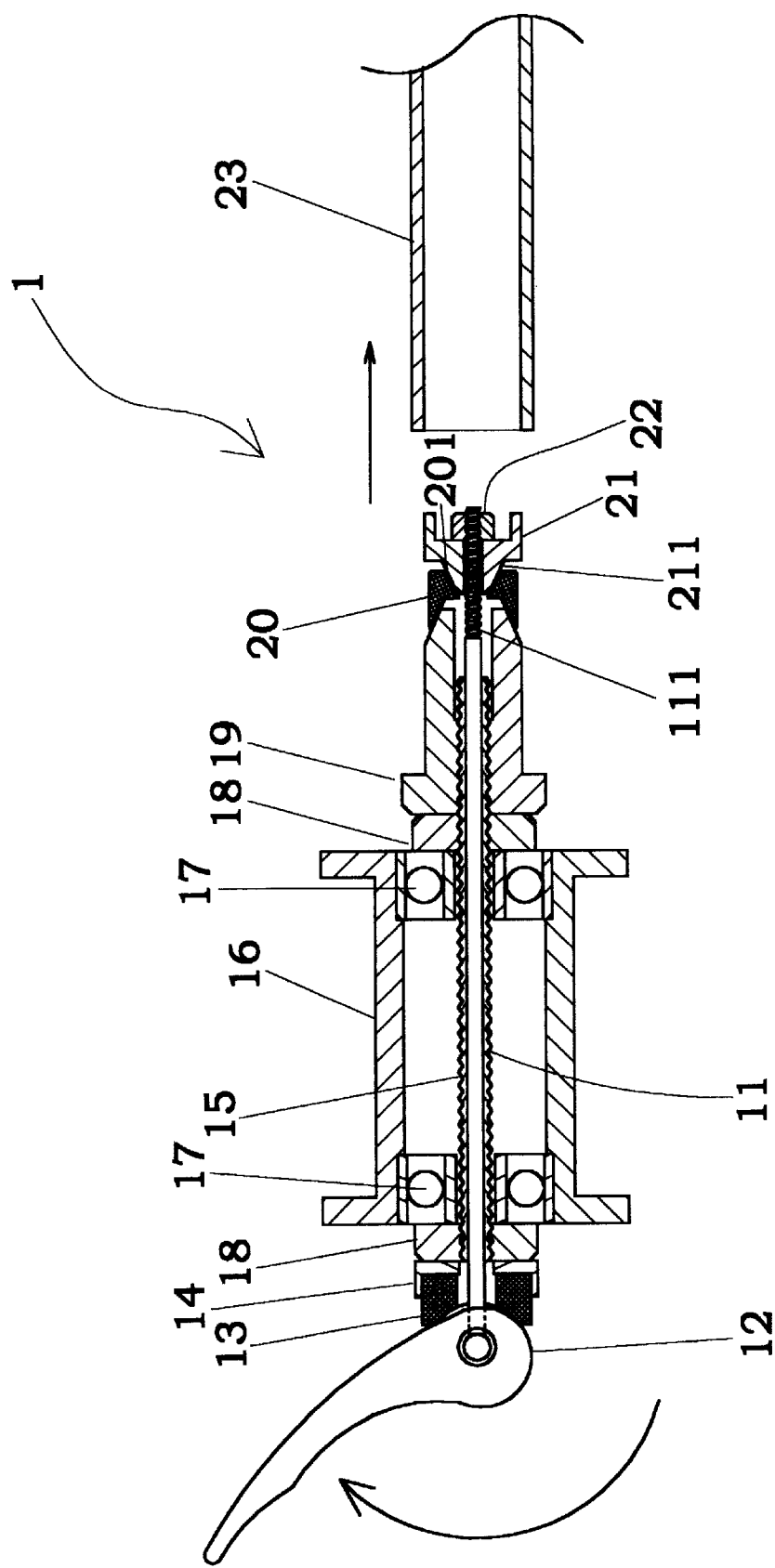
FIG. 2 is a sectional view similar to FIG. 1, wherein the fixing device is in a status allowing detachment of the hub from the baby stroller.
Figure 3:
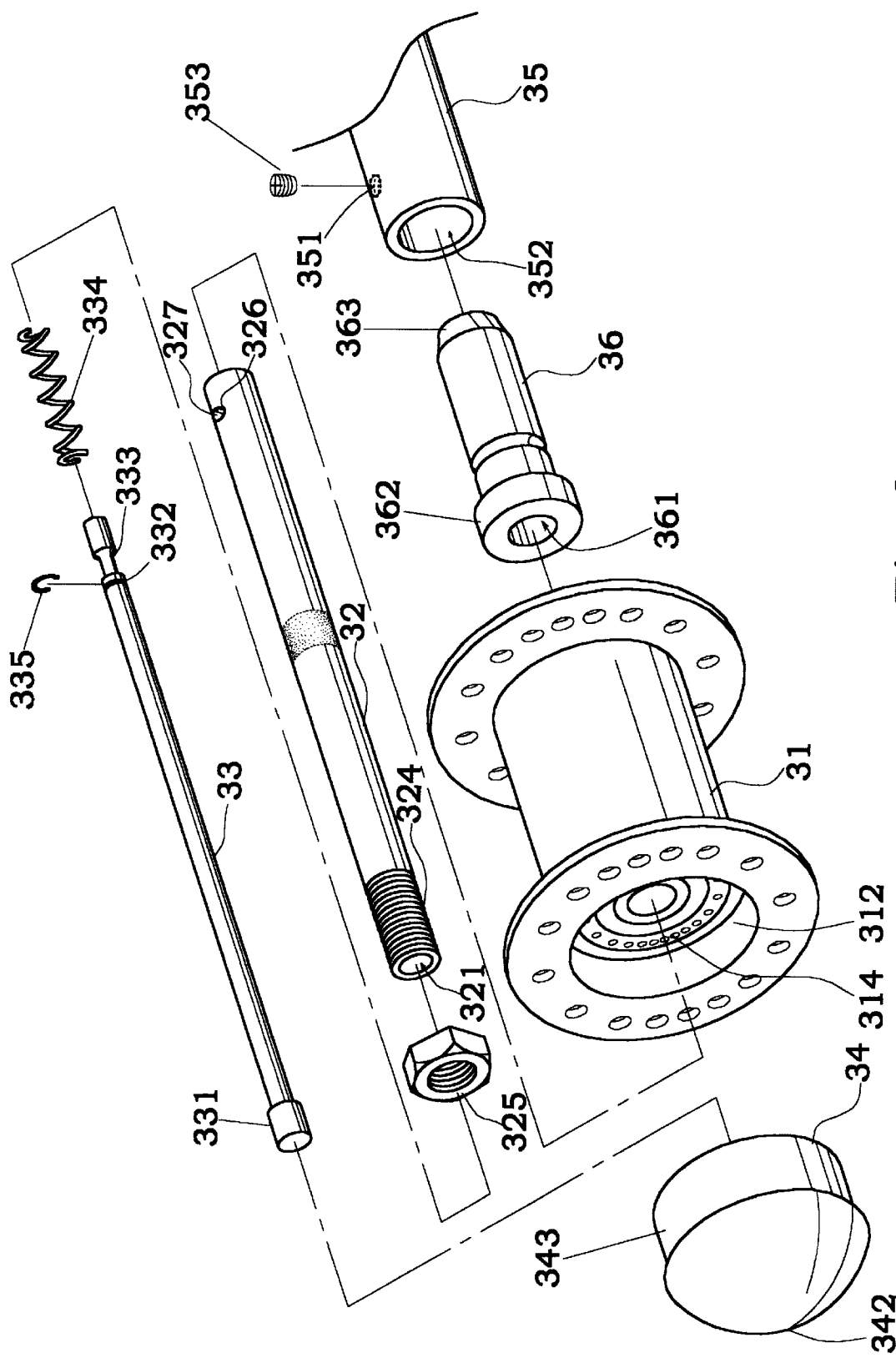
FIG. 3 is an exploded perspective view of a fixing device for a baby stroller frame and a hub in accordance with the present invention.
Figure 4:
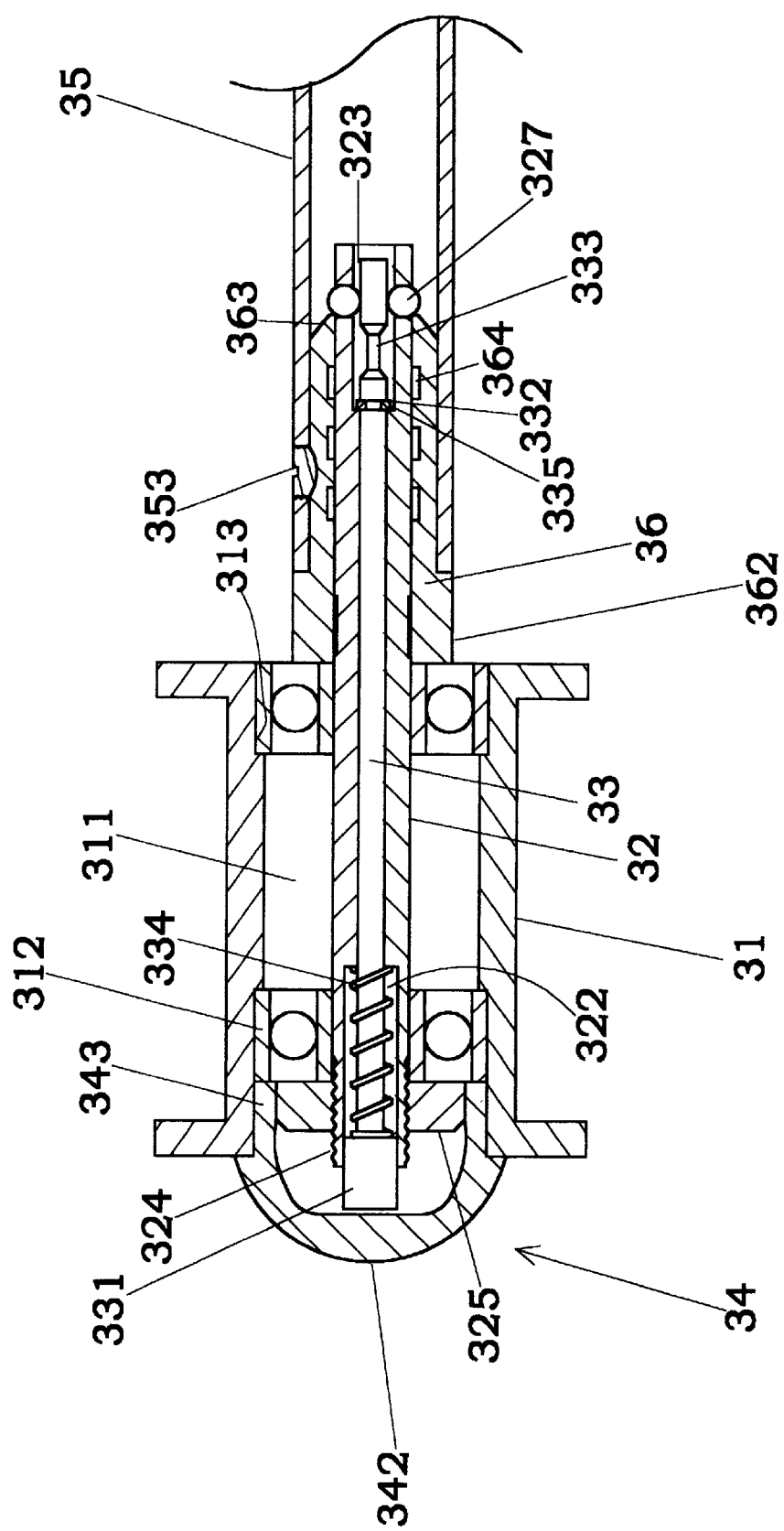
FIG. 4 is a sectional view of the fixing device in accordance with the present invention in a fixed status.

Referring to FIGS. 3 and 4, a fixing device 30 for a baby stroller frame and a hub in accordance with the present invention generally includes a hub 31, a shaft 32, a core rod 33, a dust cap 34, and a fixing sleeve 36 securely mounted in a tube 35 of a baby stroller frame.

The hub 31 and the tube 35 of the baby stroller frame are substantially the same as those of conventional constructions without large modifications. The hub 31 includes an axial hole 311 having two compartments 312 and 313 respectively defined in two ends thereof for receiving bearings 314. The compartments 312 and 313 have a diameter greater than that of the axial hole 311, and the outer (left) compartment 312 is longer than the inner (right) compartment 313.

Figure 7:
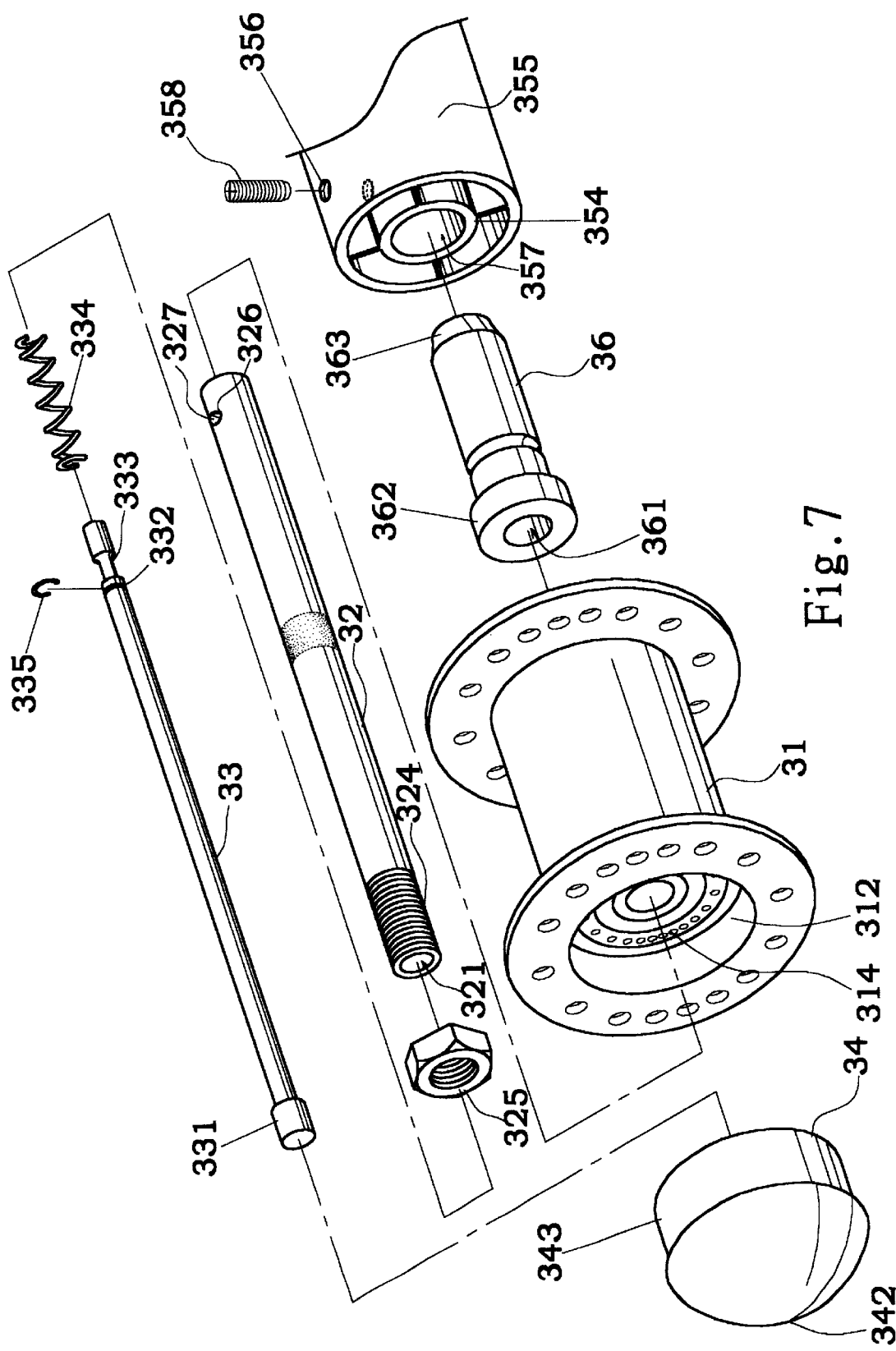
FIG. 7 is an exploded perspective view of a second embodiment of the fixing device for a baby stroller frame and a hub in accordance with the present invention.
Figure 8:
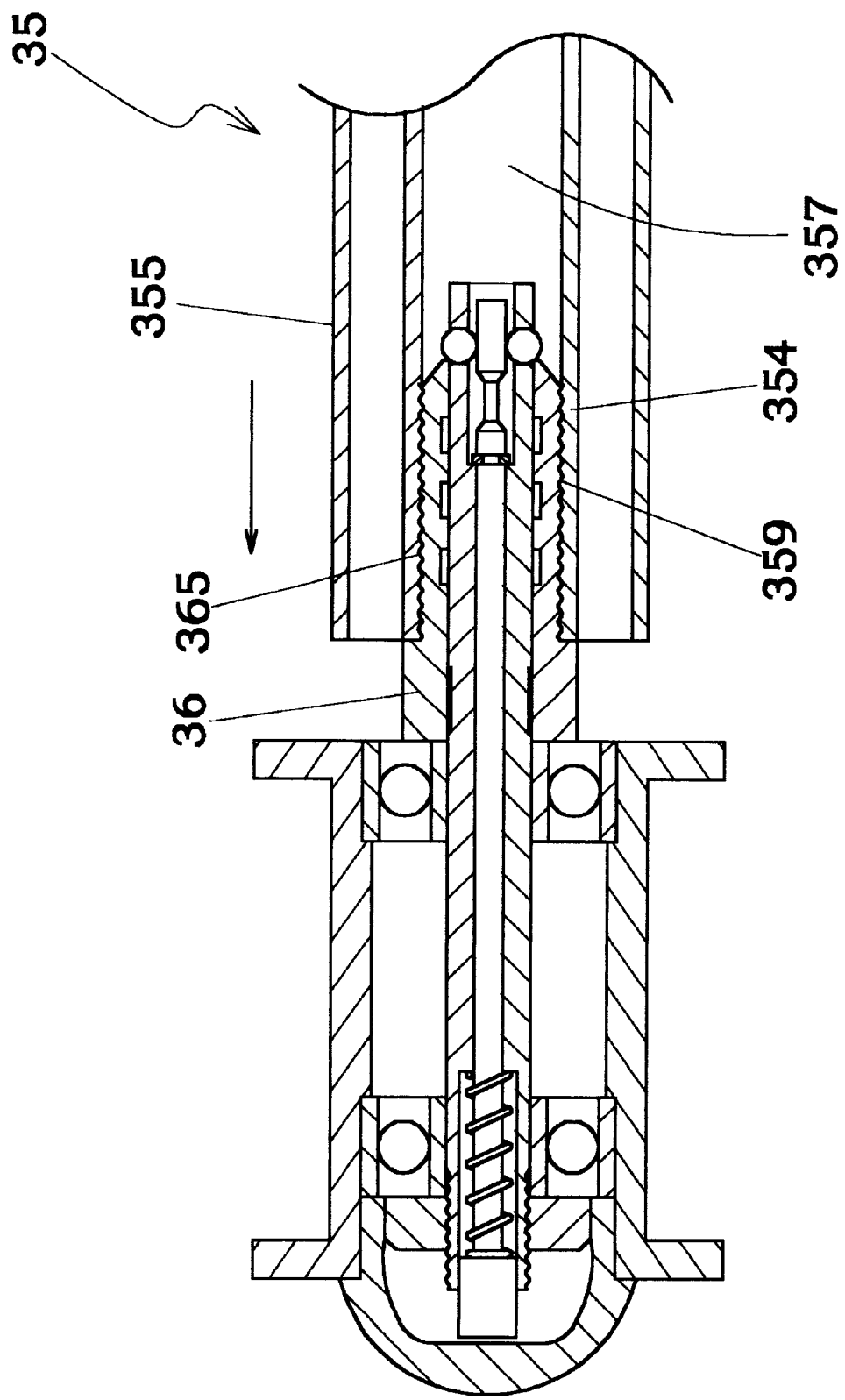
FIG. 8 is a partial sectional view illustrating a third embodiment of the fixing device for a baby stroller frame and a hub in accordance with the present invention.

The tube 35 of the baby stroller frame includes a screw hole 351 in a periphery thereof and communicated with a longitudinal hole 352 of the tube 35. A bolt 353 is mounted in the screw hole 351 to bear against an outer periphery of the fixing sleeve 36 mounted in the longitudinal hole 352 of the tube 35. Thus, the fixing sleeve 36 is securely engaged in the tube 35. Referring to FIG. 7, the tube of the baby stroller frame may include an inner tube 354 and an outer tube 355, wherein a periphery of the outer tube 355 includes a screw hole 356 communicated with the longitudinal hole 357 of the inner tube 354. A bolt 358 is inserted through the screw hole 356 to bear against an outer periphery of the fixing sleeve 36 mounted in the longitudinal hole 357 of the inner tube 354. Referring to FIG. 8, the longitudinal hole 357 of the inner tube 354 may include inner threading 359 to threadedly engage with outer threading 365 on the outer periphery of the fixing sleeve 36.

The shaft 32 is tubular and has an appropriate length to be extended through the bearings 314 in the hub 31. The shaft 32 includes a longitudinal hole 321 having two compartments 322 and 323 respectively defined in two ends thereof, the compartments 322 and 323 having a diameter greater than that of the longitudinal hole 321. An outer periphery of an end of the shaft 32 corresponding to the compartment 322 includes an outer threading 324 and is extended through the bearing 314 in the hub 31. A nut 325 is threadedly engaged with the outer threading 324 to thereby position the shaft 32 in the hub 31. The other end of the shaft 32 is extended beyond the hub 31 and includes two radial holes 326. A ball 327 is partially received in each radial hole 326. Namely, a portion of each ball 327 is exposed outside the radial hole 326.

The core rod 33 includes an enlarged first end 331 and a second end with a neck section 333. A groove 332 is defined in an outer periphery of the core rod 33 and adjacent to the neck section 333. A spring 334 is mounted around the core rod 333 adjacent to the enlarged first end 331. The core rod 333 is then extended through the longitudinal hole 321 of the shaft 32 with two ends of the spring 334 attached between the enlarged first end 331 of the core rod 333 and an end wall of the compartment 322 of the shaft 32. The enlarged first end 331 of the core rod 333 is extended beyond the compartment 322, and a C-clip 335 is mounted into the groove 332 in the second end of the core rod 33, thereby retaining the second end of the core rod 33 in the compartment 323 of the shaft 32.

The dust cap 34 is a soft cap made of plastic material with proper resiliency to provide a chamber 341 for receiving the enlarged first end 331 of the core rod 333 that is extended beyond the shaft 32. The dust cap 34 includes a dome that forms a push portion 342 and a skirt that forms a connecting portion 343 having a diameter smaller than that of the dome. The dust cap 34 prevents entrance of dust into the axial hole 311 of the hub 31 and the longitudinal hole 321 of the shaft 32. The push portion 342 of the dust cap 34 may be pushed to actuate the core rod 33.

The fixing sleeve 36 is hollow and includes a longitudinal hole 361 through which the shaft 32 extends. The fixing sleeve 36 includes an enlarged first end 362 and a tapered conic end 363. The first end 362 of the fixing sleeve 36 is fitted between the tube 35 and the hub 31. The tapered conic end 363 forms a pressing portion that bears against the balls 327 mounted on the shaft 32. Connection between the hub 31 and the tube 35 is thus completed.

Figure 5:
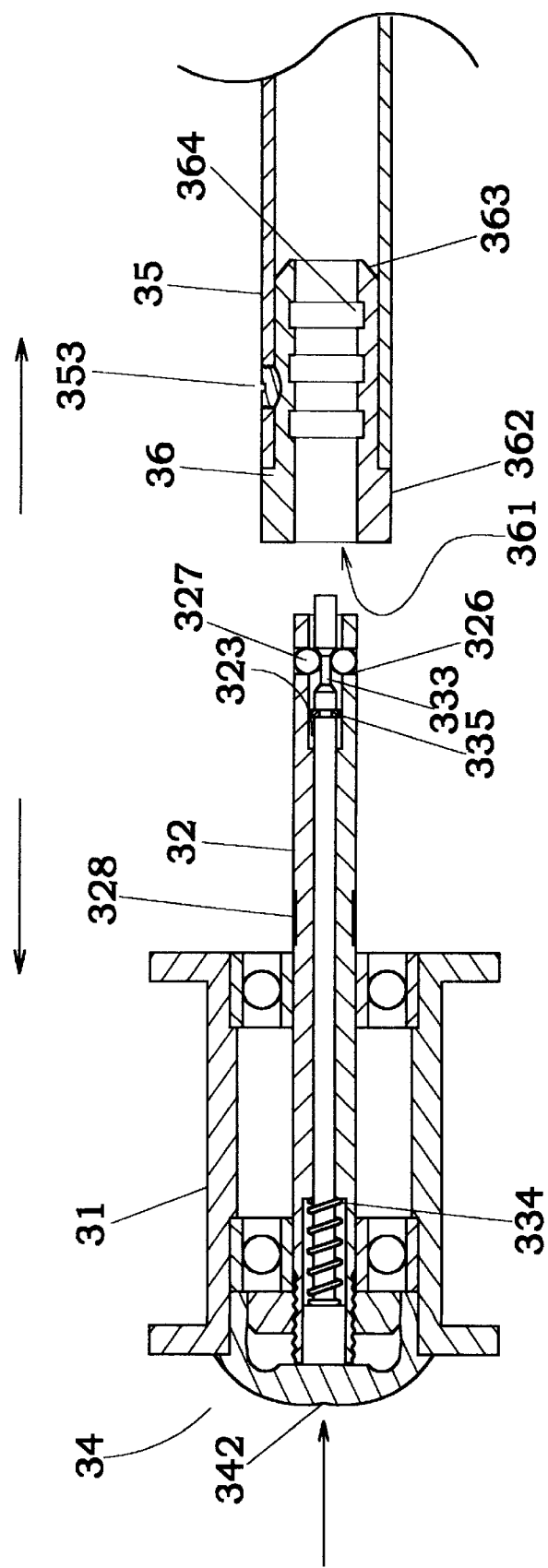
FIG. 5 is a sectional view similar to FIG. 4, wherein the fixing device is in a status allowing detachment of the hub from the baby stroller.

Referring to FIG. 5, when detaching the hub 31 from the tube 35, the push portion 342 of the dust cap 34 is pushed to actuate the core rod 33 to move longitudinally rightward. The spring 334 is compressed and the C-clip 335 is disengaged from the compartment 323 of the shaft 32 until the neck section 333 of the core rod 33 aligns with the balls 327. Thus, the balls 327 move inward and thus no longer bear against the pressing portion 363 of the fixing sleeve 36. As a result, the shaft 32 may be pulled outward to thereby disengage the hub 31 from the fixing sleeve 36. Detachment of the hub 31 from the tube 35 is thus accomplished rapidly.

Figure 6:
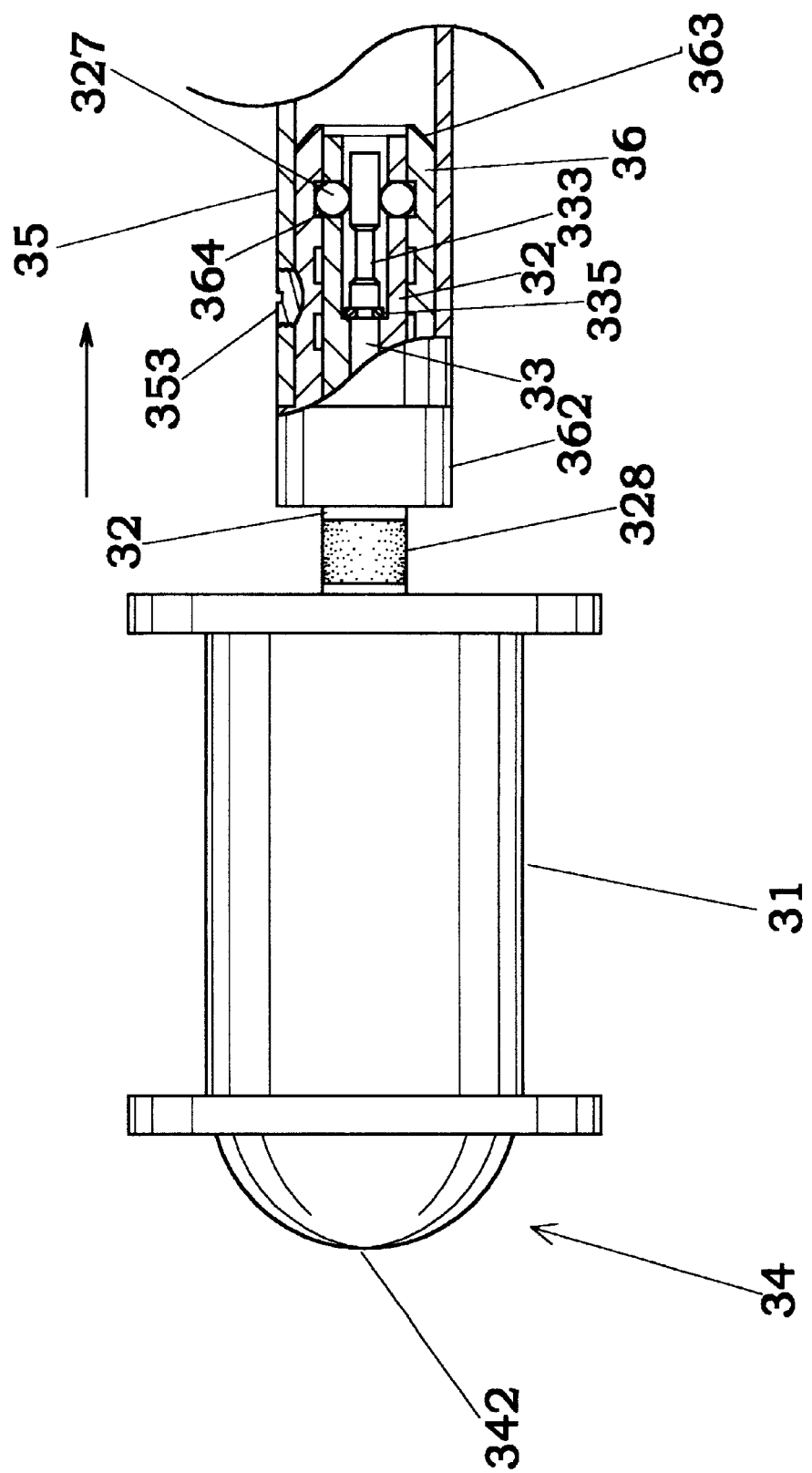
FIG. 6 is a plan view, partly sectioned, of the fixing device, illustrating hazard indication function of the fixing device.

In addition, a rear end of the longitudinal hole 361 of the fixing sleeve 36 adjacent to the pressing portion 363 includes an enlarged section 364. A portion of the shaft 32 that is located between the hub 31 and the fixing sleeve 36 includes an outer periphery that may be painted with a color to form a hazard indication section 328. A length of the hazard indication section 328 is approximately as the distance between the pressing portion 363 of the fixing sleeve 36 and the enlarged section 364. When the shaft 32 is pulled outward, the balls 327 are stuck in the enlarged section 364 to prevent further outward movement of the shaft 32. In this case, the hazard indication section 328 on the shaft 32 is exposed outside (FIG. 6), reminding the user that continuous outward pulling of the shaft 32 and the hub 31 shall cause detachment of the hub 31 from the fixing sleeve 36. Of course, the user may pull the hub 31 and the shaft 32 back and pushes the push section 342 of the dust cap 34 to make the balls 327 on the shaft 32 shrink into the neck section 333 of the core rod 33, thereby allowing further rightward movement of the core rod 33 into the fixing sleeve 36 until the balls 327 are located behind the pressing portion 363 of the fixing sleeve 36. Force applied to the core rod 33 is then released, the spring 334 returns the balls 327 to the exposed positions that bear against the pressing portion 363 of the fixing sleeve 36. The hub 31 and the tube 35 are in the connected status again.

It is noted that in a case that the hub 31 is subjected to shock such that the balls 327 on the shaft 32 shrink into the balls 326 and the shaft 32 is moved outward, provision of the hazard indication section 328 on the shaft 32 and provision of the enlarged section 364 of the fixing sleeve 36 may retain the balls 327 in place when the shaft 32 is moved to the enlarged section 364, thereby providing an auxiliary positioning effect to avoid unintentional detachment of the hub 31 from the tube 35.

According to the above description, it is appreciated that the fixing device in accordance with the present invention successfully solves the problem of unintentional detachment of the hub from the tube of the baby stroller frame. The connection between the hub and the tube is reliable. Unintentional detachment of the hub from the tube as a result of shock and unintentional impingement is prevented.

Although the invention has been explained in relation to its preferred embodiment, it is to be understood that many other possible modifications and variations can be made without departing from the spirit and scope of the invention as hereinafter claimed.

What is claimed is:

1. A fixing device for a hub and a tube of a baby stroller frame, comprising:

a hub including an axial hole having two ends, each said end of the hub having a bearing mounted therein;

a shaft being tubular and having an appropriate length, the shaft including a longitudinal hole having two ends, each said end of the shaft including a compartment having a diameter greater than that of the longitudinal hole of the shaft, one of the ends of the shaft including an outer periphery with an outer threading formed thereon, the shaft being extended through the bearings in the hub and locked in place by a nut that is threadedly engaged with the outer threading of the shaft, the other end of the shaft being extended beyond the hub and including two radial holes, a ball being partially received in each said radial hole and partially exposed beyond said radial hole;

a core rod including an enlarged first end and a second end with a neck portion and a groove, a spring being mounted around the core rod, the core rod being extended through the longitudinal hole of the shaft with the enlarged first end of the core rod extended beyond said one of the ends of the shaft with the outer threading, the spring being received in one of the compartments defined in said one of the ends of the shaft, a C-clip being mounted in the groove and retained in the other compartment defined in the other end of the shaft;

a dust cap being a soft cap made of plastic material with resiliency to provide a chamber for receiving the enlarged first end of the core rod that is extended beyond the shaft, the dust cap including a dome that forms a push portion and a skirt that forms a connecting portion having a diameter smaller than that of the dome, the dust cap preventing entrance of dust into the axial hole of the hub; and a fixing sleeve securely mounted in the tube of the baby stroller frame, the fixing sleeve including a longitudinal hole through which a portion of the shaft outside the hub extends, the balls on the shaft being biased outward by the core rod and thus exposed at a position bearing against an end of the fixing sleeve, thereby completing assembly of the baby stroller frame and the hub.

2. The fixing device as claimed in claim 1, wherein the fixing sleeve is fitted in the tube of the baby stroller frame by means of inserting a bolt through the tube to bear against an outer periphery of the fixing sleeve.

3. The fixing device as claimed in claim 1, wherein the fixing sleeve includes an enlarged first end and a tapered conic end, the enlarged first end of the fixing sleeve is fitted between the tube and the hub, the tapered conic end forms a pressing portion that bears against the balls mounted on the shaft for urging the balls into the longitudinal hole of the shaft.

4. The fixing device as claimed in claim 1, wherein the longitudinal hole of the fixing sleeve includes an enlarged section, when the hub is subjected to shock such that the balls shrink into the longitudinal hole of the shaft and that the shaft moves outward, the balls are exposed outside the shaft and stuck in the enlarged section of the fixing sleeve, thereby providing an auxiliary positioning function.

5. The fixing device as claimed in claim 4, wherein a portion of the shaft located between the hub and the fixing sleeve has an outer periphery that is painted to form a hazard indication section, the hazard indication section has a length substantially the same as a distance between the pressing portion of the fixing sleeve and the enlarged section of the fixing sleeve, when the shaft is pulled outward, the balls are stuck in the enlarged section to prevent further outward movement of the shaft, and the hazard indication section on the shaft is exposed outside to provide hazard indication.

* * * * *